(12) United States Patent
Kasajima

(10) Patent No.: US 7,603,416 B2
(45) Date of Patent: Oct. 13, 2009

(54) METHOD AND SYSTEM FOR AUTOMATICALLY TRANSFERRING ELECTRONIC MAIL OVER A COMMUNICATION NETWORK

(75) Inventor: Yasushi Kasajima, Neyagawa (JP)

(73) Assignee: Matsushita Electric Works, Ltd., Osaka (JP)

( * ) Notice: Subject to any disclaimer, the term of this patent is extended or adjusted under 35 U.S.C. 154(b) by 427 days.

(21) Appl. No.: 09/863,616

(22) Filed: May 23, 2001

(65) Prior Publication Data

US 2002/0178224 A1 Nov. 28, 2002

(51) Int. Cl.
*G06F 15/16* (2006.01)
(52) U.S. Cl. ............ 709/206; 709/202; 709/203; 709/218; 709/232
(58) Field of Classification Search ............... 709/203, 709/206, 218, 238, 202
See application file for complete search history.

(56) References Cited

U.S. PATENT DOCUMENTS 5,974,448 A * 10/1999 Yamauchi et al. .......... 709/206
6,047,327 A * 4/2000 Tso et al. ................... 709/232
6,138,146 A * 10/2000 Moon et al. ................ 709/206
6,219,694 B1 * 4/2001 Lazaridis et al. ........... 709/206
6,721,784 B1 * 4/2004 Leonard et al. ............ 709/206
6,760,753 B1 * 7/2004 Ohgushi et al. ............ 709/206
6,832,246 B1 * 12/2004 Quine ....................... 709/207

* cited by examiner

*Primary Examiner*—Yves Dalencourt
(74) *Attorney, Agent, or Firm*—William L. Androlia; H. Henry Koda

(57) ABSTRACT

A method and system for timely transferring electronic mail message over a communication network such as the Internet to a communication terminal to be transferred in accordance with a transfer trigger condition attached to the electronic mail message in advance, the trigger condition being specified by event information such as the movement and the operation of household appliance, living facility or positional information of specific terminal unit or other signals detected on the communication network. According to the present method, an electronic mail message is first sent to a communication server apparatus equipped on a communication network together with the transfer trigger condition, and after registering of the mail message, the communication server apparatus watches the transfer trigger condition and transfers the corresponding mail message of which transfer trigger condition meets a predetermined condition to a communication terminal unit to be transferred when the transfer trigger condition meets the predetermined condition.

8 Claims, 9 Drawing Sheets

M

| header | To : xxx@xxx.xxx (specify mail address of home server)<br>From : yyy@yyy.yyy<br>Subject : ZZZ<br>– normal mail header is followed – |
|---|---|
| message | "mail address of final destination", "transfer trigger condition"<br>expiration date "2000/05/12,10:50", "transfer"<br>notice of transfer "Yes"<br>– normal message is followed –<br><corresponding attached documents such as voice and image> |

*Fig.5a*

Example of mail address of final destination

| example of address | explanation |
|---|---|
| 090xxxxxxxx@xxx.ne.jp | in case of mobile phone |
| telephone | Telephone in house is called and voice of attached document is reproduced after receiver is lifted. / Message of text is read aloud.<br>It requires means for extension calling out telephone in house and text read aloud means are additionally required in home server. |
| TV | TV is automatically turned on, switched to open channel or external video input, attached image is displayed.<br>Image reproduction means is additionally required in home server. |

*Fig.5b*

Example of transfer trigger condition equipment 1 / event 1 and/or equipment 2 / evnet 2 ···  C

| equipment | event | explanation |
|---|---|---|
| entrance key | open | transferring E-mail when entrance key is opened |
| | lock | transferring E-mail when entrance key is locked |
| sensor | detect | transferring E-mail when sensor is detected |
| | over threshold | transferring E-mail when the supervised value is over given value |
| | under threshold | transferring E-mail when the supervised value is under given value |
| TV | ON | transferring E-mail is when TV is turned on |
| | OFF | transferring E-mail when TV is turned off |
| (/) | — | keyward coordinating equpment and event |
| (and) | — | used for transferring E-mail when plural events are simultaneously occurred |
| (or) | — | used for transferring E-mail when any one of events is simultaneously occurred |

*Fig.6a*

Example of transfer trigger condition (destination)  C place / kinds of shop / latitude longitude information

| place | ○○ station<br>× × hospital | in case of specifying one place |
|---|---|---|
| kinde of shop | patisserie<br>toyshop<br>convinience store | in case of not specifying shop |
| latitude/longitude information | east longitude<br>north latitude | specifying absolute position |

*Fig.6b*

From: | XXX@XXX.XXX

To: | YYY@YYY.YYY equipment:
- entrance key
- TV
- sensor event:
- ON
- OFF
- change channel message:
Are you fine?
I'm fine.
See you next time.
Bye.

*Fig.7*

METHOD AND SYSTEM FOR AUTOMATICALLY TRANSFERRING ELECTRONIC MAIL OVER A COMMUNICATION NETWORK

BACKGROUND OF THE INVENTION

1. Field of the Invention

The present invention relates to a method for automatically transferring electronic mail over a communication network such as the Internet, a system for automatically transferring electronic mail, a communication server apparatus, a server apparatus for automatic transfer and intermediary communication, and a communication server apparatus for information service.

2. Description of the Related Art

An electronic mail system over a communication network such as the Internet has been frequently used as means for sending messages, using the personal computer in a house or mobile phone. In such an electronic mail system, some of them comprise electronic mail transfer servers, by which an electronic mail message received is transferred to a destination registered in advance.

In this conventional electronic mail system, however, electronic mail messages received at the above electronic mail transfer servers are merely transferred according to request from the sender, so it would have been impossible to timely transfer electronic mail messages prepared in advance in connection with desired transfer conditions to a destination terminal according to the change in dairy living circumstances.

SUMMARY OF THE INVENTION

In view of the above circumstances, the present invention is proposed.

Accordingly, it is a primary object of the present invention to provide a method of automatically and timely transferring electronic mail messages prepared in advance in connection with desired transfer condition to a communication terminal unit to be transferred over communication network such as the Internet, according to the movement of persons or the change in dairy living circumstances or event information detected on the communication network.

It is a secondary object to provide an electronic mail automatic transfer system using a communication network such as the Internet to realize the present method.

Another object is to provide related communication apparatuses for carrying out the present invention.

In order to achieve the above primary object, the method for automatically transferring electronic mail according to a transfer trigger condition is proposed as the present invention, wherein the present method involves two technical solutions.

Namely, in the first solution according to the present invention, the method comprises the steps of; sending from a communication terminal unit, an electronic mail message together with a transfer trigger condition, which is made according to predetermined rules specified by event information, to a communication server apparatus equipped on the communication network, receiving and registering at the communication server apparatus the electronic mail together with the transfer trigger condition, and watching at the communication server apparatus the transfer trigger condition after registration of the electronic mail message whether or not the condition meets a predetermined condition and automatically transferring the corresponding electronic mail message to a communication terminal unit to be transferred when detecting the transfer condition meets the predetermined condition.

And, in the second solution according to the present invention, the method comprises the steps of; sending from a communication terminal unit an electronic mail message together with a transfer trigger condition, which is made according to predetermined rules specified by event information, to an automatic transfer and intermediary communication server apparatus equipped on the communication network, receiving and registering at the automatic transfer and intermediary communication server the electronic mail message and allocating an individual identification code to the registered electronic message and thereafter sending the transfer trigger condition corresponding to registered electronic mail message together with the allocated identification code to the predetermined destination communication terminal unit, the identification code being allocated to the respective electronic mail message registered at the automatic transfer and intermediary communication server, watching at the destination communication terminal unit whether or not the transfer trigger condition received meets a predetermined condition and sending to the automatic transfer and intermediary communication server automatic transfer command together with the identification code corresponding to the electronic mail message of which transfer trigger condition meets when the transfer trigger condition meets the predetermined condition, and automatically transferring from the intermediary communication server apparatus the corresponding registered electronic mail specified by the identification code sent from the destination communication terminal unit to a communication terminal unit to be transferred, on receiving the automatic transfer command from the destination communication terminal unit.

Further, in preferred embodiment of the above method, the trigger condition, which is to be sent to a communication server apparatus or an automatic transfer and intermediary communication server together with the electronic mail, is set an expiry date for automatic transferring and the electric mail of which expiry date has expired is automatically transferred to a communication terminal unit to be transferred or compulsory erased.

Still further, in another preferred embodiment of the above method, in the event that the transfer of the electronic mail of which transfer trigger condition meets completes or fails the transfer of electronic mail, a transfer completion notice or transfer failure notice is respectively reported to the sender, thereby rendering more reliable and higher value added service to the sender.

On the other hand, in order to achieve the above secondary object, the system for automatically transferring an electronic mail according to a transfer trigger condition is proposed as the present invention, wherein the present system further also involves two solution techniques.

Namely, in the first solution according to the present invention, the system comprises a communication terminal unit for sending an electronic mail message together with a transfer trigger condition according to specific rules specified by event information, and a communication server apparatus for receiving and registering the electronic mail message sent from the communication terminal and watching the transfer trigger condition and for automatically sending the corresponding electronic mail message of which transfer trigger condition meets a predetermined condition to a communication terminal to be transferred when the trigger condition meets, while watching the transfer condition.

And, in the second solution according to the present invention, a communication terminal unit for sending an electronic mail message together with transfer trigger condition according to predetermined rules specified by event information and an automatic transfer and intermediary communication server apparatus equipped on a communication network, for receiving and registering the electronic mail sent from the communication terminal unit and allocating an individual identification code to registered electronic mail message and for sending the transfer trigger condition corresponding to the electronic mail message together with the identification code to a destination communication terminal unit, the automatic transfer and intermediary communication server apparatus further sending the corresponding electronic mail message indicated by the identification code, on receiving transfer command together with the identification code, which are both sent from the destination communication terminal unit when the destination communication terminal unit has judged the transfer trigger condition meets a predetermined condition.

Further, in preferred embodiments of the above system, a media file whose content is audio information, image information, or the like is attached to an electronic mail which is a direct object of automatically transferring system and such system is so designed to open the file to put out the content into TV set or telephone set when having received the mail message at the communication unit to be transferred.

In order to achieve another object above-mentioned, various related communication servers which constitute an electronic mail automatically transferring system of the present invention is also proposed as the present invention, wherein the related communication servers include a communication server apparatus, to be equipped on an indoor information network for use in home or an office building, with function of registering received electronic mail therein and judging the transfer trigger condition to transfer the registered electronic mail, an automatic transfer and intermediary communication server apparatus with function of registering the electronic mail and allocating an individual identification code to the electronic mail, in addition of function of transferring of the electronic mail, and a communication server apparatus for information service, equipped on a communication network, with function of supplying of the exclusive template to fill transfer trigger condition therein to a communication terminal accessing the server for using the automatic electronic mail transfer service.

BRIEF DESCRIPTION OF THE DRAWINGS

FIG. 5a shows a message of an electronic mail and FIG. 5b shows an example of registration setting of the final destination.

FIG. 6a shows one example of transfer trigger condition and FIG. 6b shows alternate example of transfer trigger condition.

FIG. 7 explains setting operation of transfer trigger condition.

DETAILED DESCRIPTION OF THE PREFERRED EMBODIMENTS

Now preferred embodiments of the present invention are described referring to the attached drawings.

Figure 1:
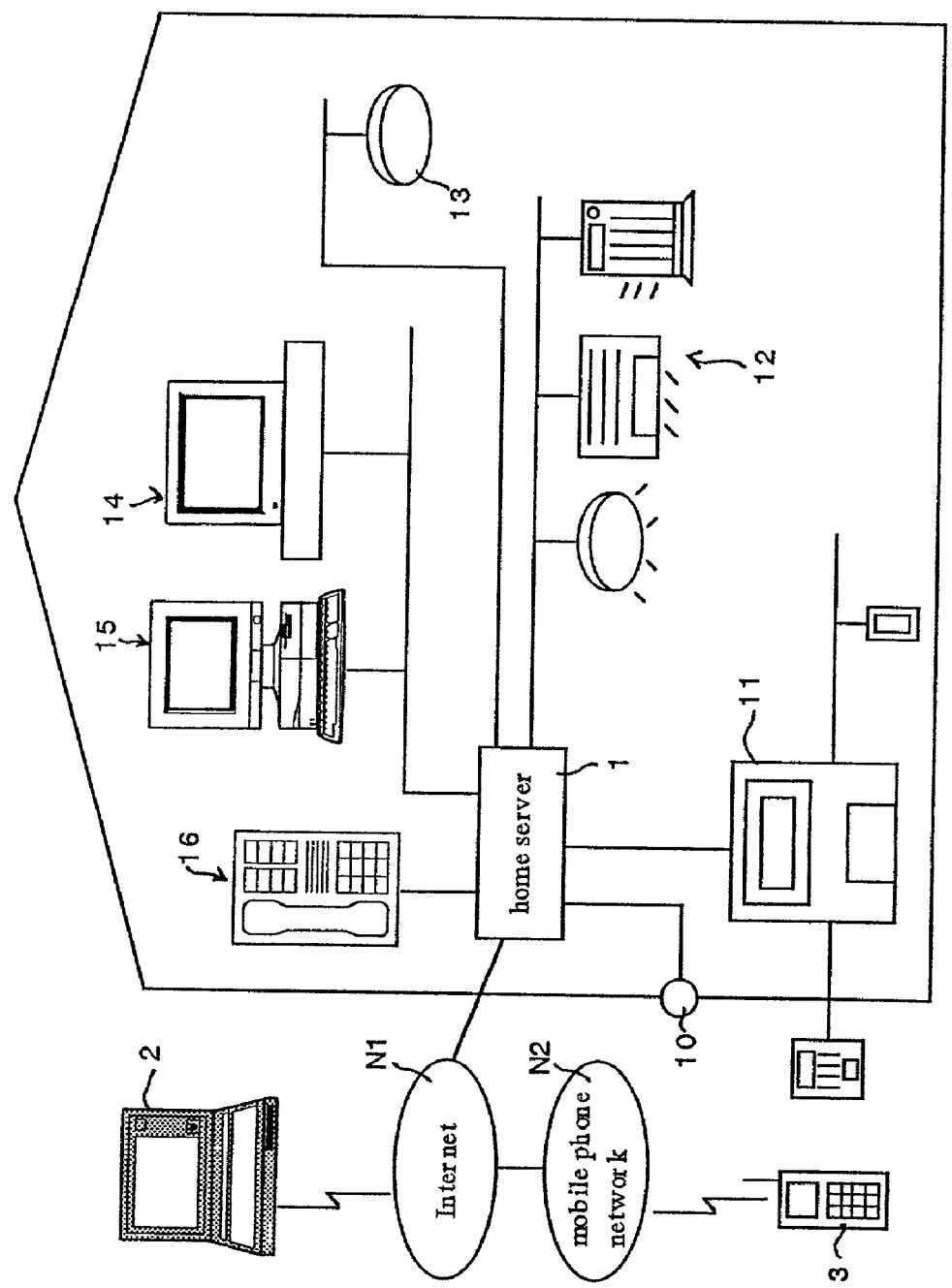
FIG. 1 is a schematic system diagram of communication network to which the present invention is applied.

FIG. 1 is a schematic system diagram of a communication network to which the present invention is applied.

In the figure, a home server 1 equipped in a house or an office is shown as a communication server capable of two-way transmission connected on a communication network. When an electronic mail is received in the home server in advance and stored to be recorded, the electronic mail is automatically transferred to a predetermined destination from the home server 1 when a transfer trigger condition, described hereinafter, is met.

Accordingly, the home server 1 is designed to register and store therein an electronic mail message to be transferred together with a transfer trigger condition specified by event information, which are sent out from a communication terminal unit over a communication network on receiving them.

The home server 1 is connected with an electric key at an entrance 10, an interphone system 11, electrical equipment 12 such as lighting equipment and air conditioner, various sensors 13, a visual apparatus 14 such as television, a communication apparatus 15 such as a personal computer, and telephone 16 and it always monitors their operational change and condition. In the system of the figure, each equipment is connected to the indoor information network wiring introduced from the home server 1 equipped in a house via a terminal device. In such a system, if an embedded terminal device provided with communication protocol conversion function is used as a terminal device of each equipment, each equipment can be monitored and controlled via a communication network such as the Internet.

Herein the Internet N1 and a mobile phone network N2 via the Internet N1 are connected as a communication network and communication with a personal computer via the Internet N1 and communication with a mobile phone 3 via the mobile phone network N2 and the Internet N1 can be conducted.

The home server 1 has function of registering the electronic mail to be automatically transferred and can register the electronic mail transferred attaching its transfer trigger condition and its destination to the server 1 from a set top box, the personal computer 2, 15 and the mobile phone 3. Therefore, the communication server apparatus of the present invention is different from a conventional electronic mail transferring server in that such transfer trigger condition is registered and stored therein together with the electronic mail message, both prepared a in advance, and thereafter only the corresponding electronic mail message is automatically transferred to the registered destination when the trigger condition meets.

The home server 1 executes appropriate process according to the function of image display and voice output for the electronic mail to be transferred if the destination terminal is a television or a telephone. Thereby, the content of the electronic mail message and an attached media file is output into the television at home, the telephone, the mobile phone, and the liquid crystal display of equipment.

The destination of the electronic mail may be in the house or out of the house. The communication equipment connected to the communication network may operate the destination equipment by home network. Its example is TV game and telephone.

The communication server equipped on the communication network receives an access from an external communication terminal unit and can register the electronic mail to be transferred and the transfer trigger condition associated with event information receivable by the communication server.

Such registration may be done in such a manner that the communication server is accessed from an external mobile terminal device, an automatic transfer registration page for electronic mail is opened, the electronic mail message to be transferred and the transfer trigger condition are filled in the prepared form, and a registration switch is operated.

Such a domestic home server above-mentioned and a specific commercial service server can be used as a communication server. If such a home server monitoring operation of the equipment used in the house is employed as a communication server, the transfer trigger condition can be registered by associating operation information of the electrical key of entrance 10, operation information of the electrical equipment 12 such as lighting equipment and an air conditioner, or positional information of the mobile phone 3 as event information. With respect to the positional information of the mobile terminal device as held by a person in a house, such a positional information service rendered by another server may be available.

Therefore according to the system, when change of the equipment or control execution result, like when the electric key 10 is opened or closed, the air conditioner is turned on or off, the lighting apparatus is turned on or off, is informed, change of the sensor 13 is detected, network connection of the equipment is detected, and when a person taking a mobile device 3 drops into a specific shop or arrives at a specific place, all of them become transfer trigger, and the electronic mail prepared in advance and registered in the communication server can be automatically transferred to the registered destination or mobile device 3 so that information can be timely transmitted according to movement or change in daily living circumstances.

Figure 2:
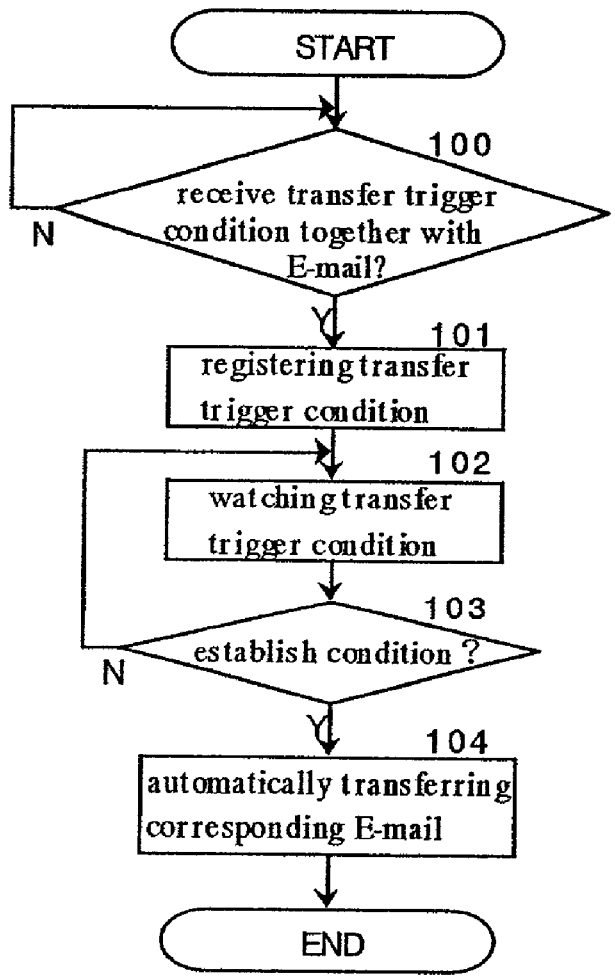
FIG. 2 is a flow chart showing basic operations of a method for automatically transferring an electronic mail according to the present invention.

FIG. 2 is a flow chart showing basic operations of the above-mentioned home server 1. The transfer trigger condition specified by a specific event information is attached to the electronic mail according to a predetermined rule and is transferred to the home server 1 equipped on the communication network from the communication terminal unit.

In such a case if the home server 1 has a function of deciphering the transfer trigger condition described in a text form, the transfer trigger condition may be appended as a text form before the message of the electronic mail.

The home server 1 receives and records the electronic mail together with transfer trigger condition. Then while watching whether the event information contained in the transfer trigger condition meets a predetermined transfer trigger condition, when the transfer trigger condition meets the predetermined condition, the home server 1 automatically transfers the corresponding electronic mail to the corresponding communication terminal unit to be transferred according to the transfer trigger condition (100-104).

According to such a system of the present invention, if a child is going to play a television game at the destination of the electronic mail, the electronic mail from his mother "Only one hour for playing game!" is shown on the display. Or when a father leaving alone for job purposes turns on a heater, an electronic message from his family "It is getting cold. Take care of yourself." is transferred to his mobile phone. Or if an elder person living alone makes tea using an electric pot, a telephone rings and the message from his grandchild "How are you?" is reproduced when the elder person answers the telephone.

Further, when a father passes in front of a cake shop on his way home after work, a voice or a character message "Buy the cake!" is transferred to his mobile phone. A mother checks a bargain day by advertising catalogs in newspaper, determines goods to be purchased per a shop, and registers its message for herself as a memo. When she approaches the registered shop, a voice or a character message such as "Buy milk in this shop." is transferred to her mobile phone.

Figure 3:
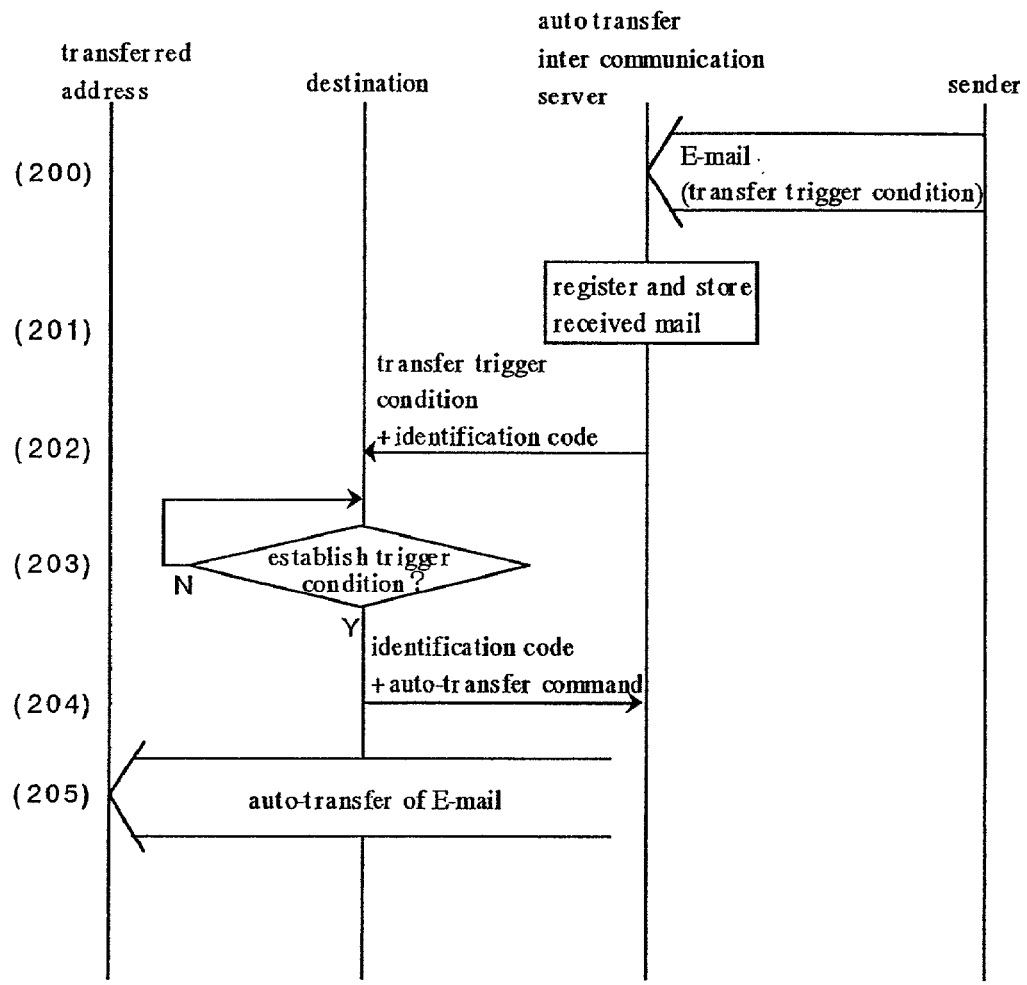
FIG. 3 shows basic operational procedures of a method for automatically transferring an electronic mail according to the present invention.

Next, another construction of a method for automatically transferring electronic mail is explained. As shown in FIG. 3, the address of the destination and the sender and the transfer trigger condition specified by a specific event information are attached to an electronic mail according to a predetermined rule and transferred to an automatic transfer and intermediary communication server apparatus equipped on a communication network from the communication terminal unit (200).

According to such an automatic transfer and intermediary communication server apparatus, received electronic mail is registered and stored (201), and its transfer trigger condition is transferred to the predetermined destination communication terminal unit together with the identification code of the registered and stored electronic mail (202).

The predetermined destination communication terminal unit sends automatic transferring command together with the identification code of the electronic mail to the automatic transfer and intermediary communication server apparatus when the event information contained in the transfer trigger condition meets the predetermined transfer trigger condition, while monitoring the transfer trigger condition (203, 204).

The automatic transfer and intermediary communication server apparatus which has received its automatic transferring command automatically transfers the electronic mail specified by the identification code to the corresponding communication terminal unit to be transferred following the transfer trigger condition (205).

Figure 4:
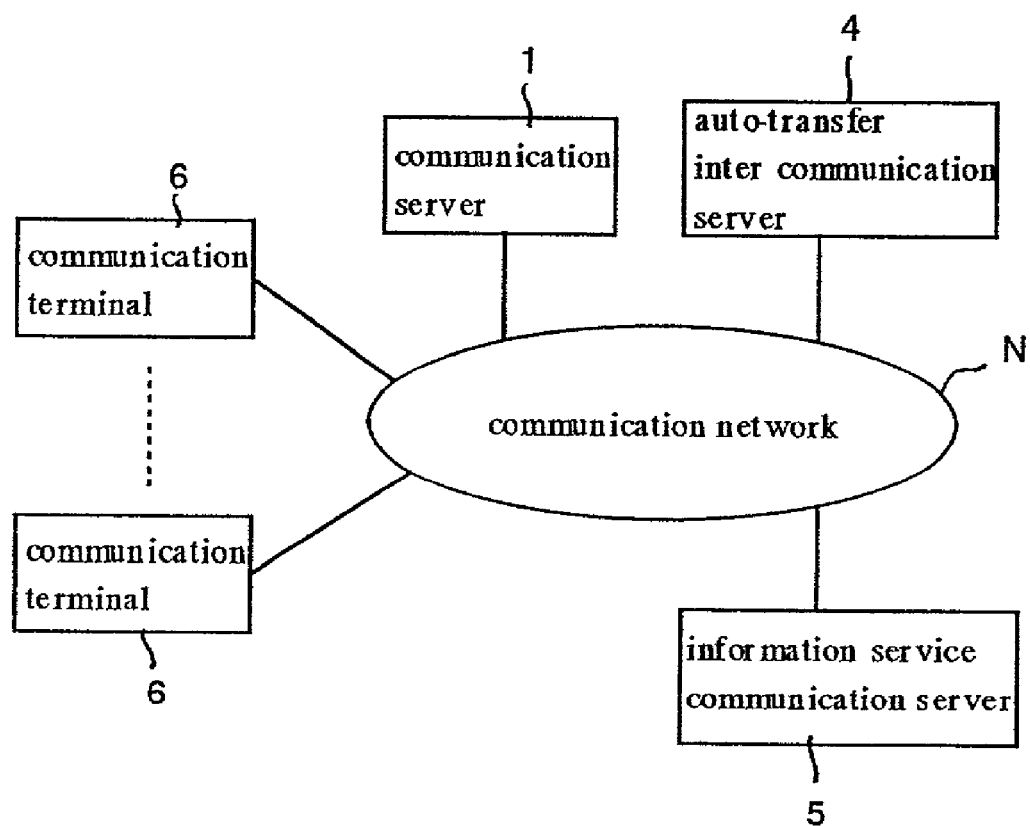
FIG. 4 shows a schematic system diagram of automatically transferring an electronic mail system according to the present invention.

FIG. 4 shows still another system of the present invention. In this system, a communication network N is provided with an information service communication server apparatus 5 other than a communication server apparatus 1, an automatic transfer and intermediary communication server apparatus 4, and a communication terminal unit 6. These server apparatus 1, 4, 5 aren't required to be provided separately and one server apparatus can be provided with functions of each server.

The information service communication server 5 can download a specific electronic mail input template to input the transfer trigger condition specified by specific event information. The template is designed to make a specific entry form by inputting text so that a user who wants to transfer electronic mail while he goes out can register such setting by having access from a simple communication terminal unit 6.

FIG. 5-FIG. 7 show set up example of the transfer trigger condition. As shown in FIG. 5a, the mail address of the final destination and the transfer trigger condition are described in the message following the header of the electronic mail. Further, expiration term (date, time), process at the time (compulsory transfer/delete), and yes/no of transfer completion notice or transfer failure notice, they are explained later, are set.

Examples of the mail address of the final destination are a mobile phone 3, a telephone 16, and a television 14 as shown in FIG. 5b. If it is a telephone 16, when an ear receiver is picked up, voice message of the attached file is reproduced or the text of the message is read aloud. If it is a television 14, power is automatically turned on, the television is switched to an open channel or an external video input, and the image of the attached file is shown.

The examples of the transfer trigger condition as event information are shown in FIG. 6a. In case of "entrance key/open, and sensor/detect", an electronic mail is transferred when the entrance is opened and a sensor is detected. Or as shown in FIG. 6b, the name of place, the kinds of shop, or longitudinal and latitudinal information can be transfer trigger condition. In this case, positional information of the mobile terminal is required to be obtained by periodically communicating with the position server of the mobile phone 3. Or in case of specifying by the kinds of shop, database of the positional information of shops is required.

The home server 1 collets and registers the name of equipment and corresponding event information every time an equipment is connected to a home network. The home server 1 transfers the mail address of the home server 1, the mail address information of destination, and equipment event information to the server on the Internet. A person who wants to send an electronic mail via the home server 1 searches the information stored in the server on the Internet using the mail address information of its destination as a key word. Thereby, he obtains the mail address of the home server of the destination, its corresponding equipment, and event information.

In this time, a file or template document of electronic mail in which combination of event capable of message transferring like "xxx@xxx.xxx, equipment A/ON" be downloaded. There is function of sending electronic mail heading for the home server 1 by selecting the equipment name and the event information from the scroll box on Web screen of the server and writing message in its text box (See FIG. 7).

FIG. 7 shows a setting example of transfer trigger condition. When a preset event is occurred in a preset equipment, the message of electronic mail is transferred. Here the mail is set to be transferred when the television 14 is turned off.

According to the method for automatically transferring an electronic mail of the present invention, media file storing voice information and image information is attached to the electronic mail registered by the communication server apparatus 1. The communication terminal 6 to which the electronic mail is transferred is a telephone and a television connected to an indoor information network. The communication server apparatus 1 has function of automatically opening the media file and outputting the content to the communication terminal unit 6 when starting transferring of the received electronic mail message according to the transfer trigger condition. Therefore, the communication server apparatus 1 can automatically open the attached file and output voice and image into a television or a telephone by its image displaying function and voice output function. Operational information of the equipment to be informed to the communication server apparatus 1 can be used as event information for specifying the transfer trigger condition. When indoor information network is connected to the home server 1, operational information of the equipment monitored by the home server 1 is used as event information. For example, typical equipment is an entrance key of a house, an air conditioning apparatus, a lighting apparatus, and a heating apparatus.

Further, command information and positional information of a specific terminal device sent from the service server and the communication terminal device 6 on network can be used as event information for specifying the transfer trigger condition. Such an example is positional information, specific command information, and message information sent from the service server and the communication terminal device 6.

Next, still another operation of the method for automatically transferring an electronic mail is explained. In this system, the expiry date for automatic transferring can be further set as the transfer trigger condition. Accordingly, it is prevented that an old message is sent losing its chance. The expiry date for automatic transferring is set after the transfer trigger condition in the message of electronic mail (See FIG. 5a).

If the expiry date for automatic transferring set in the transferring condition of the electronic mail expires, the expired mail is sent to the communication terminal unit 6 to be transferred or it is deleted. Therefore, when the transfer trigger condition isn't met within the expiry date, the electronic mail can be deleted or forcibly transferred so as to do the same operation as the transfer trigger condition is met. Further, memory capacity over can be prevented. Which process is executed when the expiry date for automatic transferring expires is set after the transfer trigger condition in the message of the electronic mail together with the expiry date for automatic transferring (See FIG. 5a).

Figure 8:
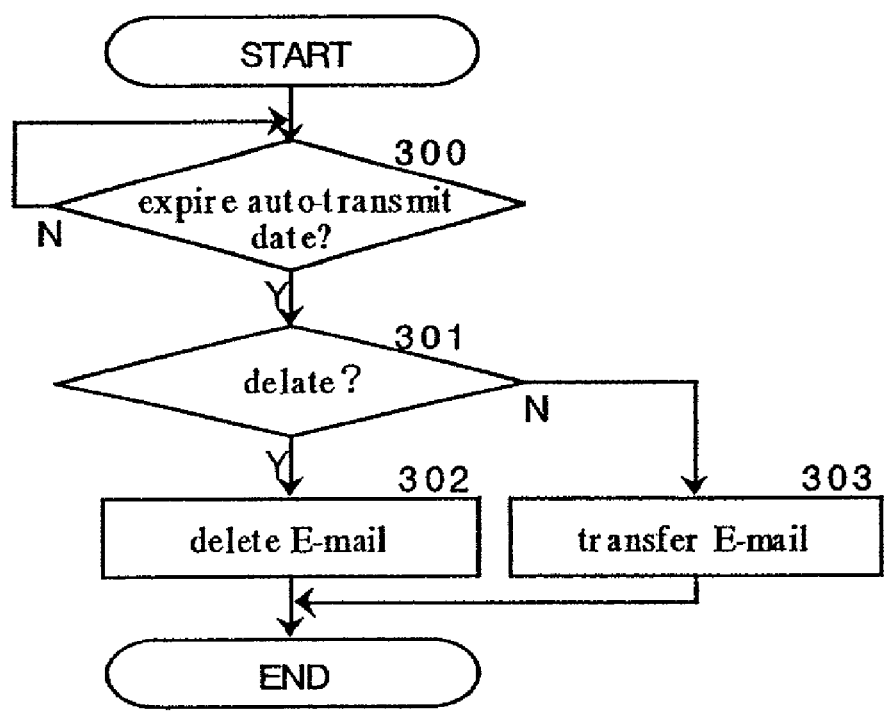
FIG. 8 is a flow chart showing another operations of a method for automatically transferring an electronic mail according to the present invention.

FIG. 8 is a flow chart showing its operation. On the expiry date for automatic transferring, the electronic mail is erased if deleting is set, or it is transferred to the communication terminal unit 6 to be transferred if deleting isn't set (300-303).

Then still further operation of the method for automatically transferring an electronic mail is explained. In this system, the communication server 1 further has function to send a transfer completion notice to its sender when the electronic mail is sent to its destination according to its transfer trigger condition. When the electronic message transferred according to the transfer trigger condition isn't sent to the destination properly, the communication server 1 sends a transfer failure notice to its sender. Yes/No of the transfer completion notice and the transfer failure notice is set after the transfer trigger condition and the expiry date for automatic transferring in the message of the electronic mail (See FIG. 5a).

Figure 9:
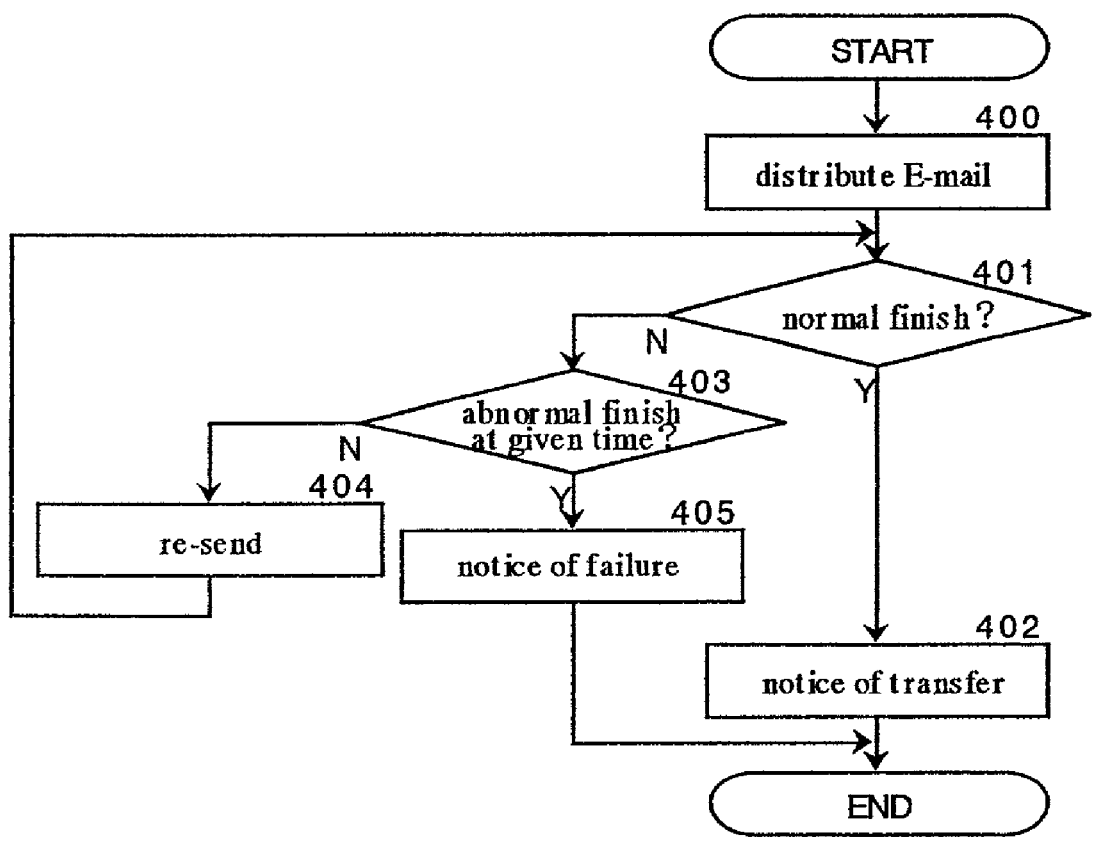
FIG. 9 is a flow chart showing still another operations of a method for automatically transferring an electronic mail according to the present invention.

FIG. 9 shows a flow chart of the above-mentioned operation. When the transferring of electronic mail is normally finished, the transfer completion notice is sent to the sender (400-402). However in case of abnormal finish, the mail is retransferred. When transference is failed after trying a predetermined numbers of times, it is judged as transfer failure and the notice of transfer failure is sent (403-405).

As is apparent from the above, according to the present invention, the communication server apparatus receives and records an electronic mail together with its transfer trigger information, the corresponding electronic mail is automatically transferred to the corresponding communication terminal unit to be transferred according to the transfer trigger condition if the transfer trigger condition is met while monitoring the condition. Therefore, timely information transmission according to movement or change in daily living circumstances can be achieved.

According to the method using the automatic transfer and intermediary communication server apparatus on communication network, the predetermined destination communication terminal unit sends automatic transferring command to the automatic transfer and intermediary communication server apparatus when the transfer trigger condition is met while monitoring the condition. Further, the automatic transfer and intermediary communication server apparatus receiving the automatic transfer command automatically sends the specified electronic mail to the communication terminal unit of the corresponding communication terminal to be transferred according to the transfer trigger condition. Therefore, timely information transmission according to movement or change in daily living circumstances can be achieved.

Moreover, as the predetermined destination communication terminal unit monitors the transfer trigger condition, process load on the automatic transfer and intermediary communication server apparatus can be alleviated. And as the electronic mail to be transferred is stored and registered in the automatic transfer and intermediary communication server apparatus, the predetermined destination communication terminal unit has only to judge the transfer trigger condition so that memory capacity for the communication terminal unit is reduced and simply constructed communication terminal unit can be used.

Still further aspects and advantages of the invention will be more apparent from the following description.

It should be also understood that the present invention is not limited to the embodiments disclosed in the specification and it goes without saying that variations may be made without departing from the spirit and scope of the present invention.

What is claimed is:

1. A method for automatically transferring an electronic mail over a communication network, executed by an automatic transfer and intermediary communication server apparatus, wherein said automatic transfer and intermediary communication server apparatus is a home server equipped on an indoor information network connected to said communication network for observing an electronic apparatus connected to said indoor information network, wherein said method comprises the steps of:

sending from a communication terminal unit to said automatic transfer and intermediary communication server apparatus an electronic mail in which a transfer trigger condition is written together with an address of a destination terminal communication unit to be transferred according to predetermined rules, said transfer trigger condition including event information about operation and change of said electronic apparatus, and about arrival at a specified place of a mobile electronic apparatus, positional information of which is obtained from a predetermined server apparatus over said communication network, receiving, registering, and storing at said automatic transfer and intermediary communication server apparatus said electronic mail sent from said communication terminal unit and allocating an individual identification code to said registered electronic mail, and thereafter sending said transfer trigger condition together with said allocated identification code to said electronic apparatus and/or said predetermined server apparatus, watching at said electronic apparatus said event information and sending an automatic transfer command together with the corresponding allocated identification code to said automatic transfer and intermediary communication server apparatus when said transfer trigger condition has been met due to the operation and the change of said electronic apparatus, watching at said predetermined server apparatus said event information and sending an automatic transfer command together with the corresponding allocated identification code to said automatic transfer and intermediary communication server apparatus when said transfer trigger condition has met due to arrival at the specified place of said mobile electronic apparatus, and transferring from said automatic transfer and intermediary communication server apparatus to said destination communication unit the corresponding electronic mail when receiving said automatic transfer command together with said corresponding allocated identification code from said electronic apparatus or said predetermined server apparatus.

2. The method of claim 1, wherein said transfer trigger condition further includes an expiry date of automatic transferring for said registered electronic mail.

3. The method of claim 2, wherein said electronic mail of which expiry date for automatic transferring has expired is transferred to a destination communication terminal unit with the address to be transferred or is erased, when the corresponding expiry date set in said transfer trigger condition expires.

4. The method of claim 1, wherein said communication server apparatus or said automatic transfer and intermediary communication server apparatus sends a transfer completion notice to the communication terminal unit of the sender after completing transfer of the corresponding electronic mail according to said transfer trigger condition.

5. The method of claim 1, wherein said communication server apparatus or said automatic transfer and intermediary communication server apparatus sends a transfer failure notice to the communication terminal unit of the sender when having failed to transfer the corresponding electronic mail to said destination communication terminal unit according to said transfer trigger condition.

6. A system of automatically transferring electronic mail, comprising:

a communication terminal unit for sending an electronic mail in which a transfer trigger condition is written together with an address of a destination communication terminal unit to be transferred according to specific rules, and an automatic transfer and intermediary communication server apparatus equipped on an indoor information network connected to said communication network, wherein said transfer trigger condition includes event information about the operation and the change of said electronic apparatus, and about arrival at a specified place of a mobile electronic apparatus, positional information of which is obtained from a predetermined server apparatus over said communication network, wherein said automatic transfer and intermediary communication server apparatus is a home server for observing an electronic apparatus connected to said indoor information network, and receives and registers said electronic mail, and allocates an individual identification code to said electronic mail as registered, and then sends said transfer trigger condition together with said allocated identification code to said electronic apparatus, wherein said electronic apparatus watches said electronic apparatus and sends an automatic transfer command together with said allocated identification code to said automatic transfer and intermediary communication server apparatus when said transfer trigger condition has been met, due to the operation and the change of said electronic apparatus, wherein said predetermined server apparatus watches said electronic apparatus and sends an automatic transfer command together with said allocated identification code to said automatic transfer and intermediary communication server apparatus when said transfer trigger condition has met due to arrival at a specified place of said mobile electronic apparatus, and wherein said automatic transfer and intermediary communication server apparatus transfers to said destination communication unit the corresponding electronic mail when receiving said automatic transfer command together with said corresponding allocated identification code from said electronic apparatus and/or said predetermined communication server.

7. The system of claim 6, wherein a media file including at least either one of audio information, and image information is attached to said electronic mail and said destination communication terminal unit with the address to be transferred is either a TV set or telephone set connected to said indoor information network system, and said communication server apparatus or said automatic transfer and intermediary communication server apparatus automatically opens said media file to output the contents of said media file into said communication terminal unit with the address to be transferred, on transferring said electronic mail when said transfer trigger condition is met.

8. A communication server apparatus for information service equipped on a communication network, wherein said communication server apparatus for information service is a home server equipped on an indoor information network connected to said communication network for observing household appliances or facility connected to said indoor network, and comprises;

means for receiving and registering an electronic mail in which a transfer trigger condition is written together with an address of said destination communication terminal unit to be transferred according to predetermined rules, said transfer trigger condition including event information about operation and change of said household appliances or facility, and about arrival at a specified place of a mobile electronic apparatus, positional information of which is obtained from a predetermined communication server over said communication network, means for watching said electronic apparatus and said mobile electronic apparatus after registration of said electronic mail and for transferring corresponding electronic mail whose transfer trigger condition meets to said destination communication terminal unit, when said transfer trigger condition has met due to the operation and the change of said household appliances or facility, or arrival at a specified place of said mobile electronic apparatus, and means for enabling a communication terminal unit to download a specific template in which said transfer trigger condition is rewritable together with said address of said destination communication terminal unit to be transferred, when said communication terminal unit accesses to said communication server apparatus for information service.

* * * * *